United States Patent
Zhou et al.

(10) Patent No.: US 11,695,465 B2
(45) Date of Patent: Jul. 4, 2023

(54) HIGH RELIABILITY TRANSMISSION MODE FOR 2-STEP SECONDARY CELL BEAM FAILURE RECOVERY PROCEDURE

(71) Applicant: QUALCOMM Incorporated, San Diego, CA (US)

(72) Inventors: Yan Zhou, San Diego, CA (US); Kiran Venugopal, Raritan, NJ (US); Tianyang Bai, Somerville, NJ (US); Jung Ho Ryu, Fort Lee, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 17/067,318

(22) Filed: Oct. 9, 2020

(65) Prior Publication Data

US 2021/0111787 A1 Apr. 15, 2021

Related U.S. Application Data

(60) Provisional application No. 62/914,365, filed on Oct. 11, 2019.

(51) Int. Cl.
| | |
|---|---|
| *H04B 7/08* | (2006.01) |
| *H04W 80/02* | (2009.01) |
| *H04W 76/11* | (2018.01) |
| *H04W 72/044* | (2023.01) |
| *H04W 16/28* | (2009.01) |
| *H04W 72/23* | (2023.01) |

(52) U.S. Cl.
CPC ......... *H04B 7/0868* (2013.01); *H04W 16/28* (2013.01); *H04W 72/046* (2013.01); *H04W 72/0466* (2013.01); *H04W 72/23* (2023.01); *H04W 76/11* (2018.02); *H04W 80/02* (2013.01)

(58) Field of Classification Search
CPC .......... H04W 72/046; H04W 72/0466; H04W 72/14; H04W 76/11; H04W 76/19
See application file for complete search history.

(56) References Cited

U.S. PATENT DOCUMENTS

| | | | |
|---|---|---|---|
| 2018/0278310 A1* | 9/2018 | Lee | H04B 7/0645 |
| 2019/0253941 A1* | 8/2019 | Cirik | H04W 36/0077 |
| 2019/0313461 A1* | 10/2019 | Jung | H04W 24/04 |
| 2020/0107331 A1* | 4/2020 | Tsai | H04W 72/085 |
| 2020/0145280 A1* | 5/2020 | Cirik | H04L 41/0668 |
| 2020/0245176 A1* | 7/2020 | Zhou | H04B 7/0408 |
| 2020/0266876 A1* | 8/2020 | Yu | H04B 7/0695 |

(Continued)

FOREIGN PATENT DOCUMENTS

| | | |
|---|---|---|
| WO | 2018232259 A1 | 12/2018 |
| WO | 2019135654 A1 | 7/2019 |

OTHER PUBLICATIONS

OPPO; "Issues on supporting SCell BFR RACH"; 3GPP TSG-RAN2 #101 bis Sanya, China, Apr. 16-20, 2018; R2-1804434 (Year: 2018).*

(Continued)

*Primary Examiner* — Gary Mui
(74) *Attorney, Agent, or Firm* — Patterson + Sheridan, L.L.P.

(57) ABSTRACT

Aspects of the present disclosure relate to wireless communications, and more particularly, to techniques for performing beam failure recovery involving a secondary cell.

26 Claims, 6 Drawing Sheets

(56) References Cited

U.S. PATENT DOCUMENTS

| | | | |
|---|---|---|---|
| 2020/0383167 A1* | 12/2020 | Sengupta | H04W 72/0413 |
| 2021/0013949 A1* | 1/2021 | Agiwal | H04W 16/28 |
| 2021/0029724 A1* | 1/2021 | Tsai | H04W 72/046 |
| 2021/0068162 A1* | 3/2021 | Agiwal | H04W 56/001 |
| 2021/0068188 A1* | 3/2021 | Ryu | H04L 5/0048 |
| 2021/0092003 A1* | 3/2021 | Zhou | H04W 72/14 |
| 2021/0105058 A1* | 4/2021 | Lin | H04B 7/0695 |
| 2021/0105759 A1* | 4/2021 | Bai | H04W 72/0406 |
| 2021/0111787 A1* | 4/2021 | Zhou | H04W 76/19 |
| 2021/0112619 A1* | 4/2021 | Bai | H04L 5/001 |
| 2021/0126690 A1* | 4/2021 | Matsumura | H04B 7/0654 |
| 2021/0195676 A1* | 6/2021 | Wang | H04W 72/1268 |

OTHER PUBLICATIONS

Vivo; "Discussion on the SCell BFR"; 3GPP TSG-RAN WG2 Meeting #101bis Sanya, China, Apr. 16-20, 2018; R2-1804696 (Year: 2018).*
Qualcomm Inc; "Correction to SR procedure under beam failure"; 3GPP TSG-RAN WG2 #105 Athens, Greece, Feb. 25-Mar. 1, 2019; R2-1901763 (Year: 2019).*
International Search Report and Written Opinion—PCT/US2020/055166—ISA/EPO—dated Dec. 8, 2020.

* cited by examiner

HIGH RELIABILITY TRANSMISSION MODE FOR 2-STEP SECONDARY CELL BEAM FAILURE RECOVERY PROCEDURE

PRIORITY CLAIM(S)

This application claims benefit of the priority to U.S. Provisional Application No. 62/914,365, filed on Oct. 11, 2019, which is expressly incorporated by reference in its entirety as if fully set forth below and for all applicable purposes.

BACKGROUND

Field of the Disclosure

Aspects of the present disclosure relate to wireless communications, and more particularly, to techniques for performing beam failure recovery involving a secondary cell.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improving reliability of beam recovery messaging.

Certain aspects of the present disclosure provide a method for wireless communication by a user equipment (UE). The method generally includes performing beam failure detection (BFD) of a beam pair link (BPL) associated with a secondary cell (SCell) in carrier aggregation (CA), sending a beam failure recovery request (BFRQ) message to another cell, the BFRQ message including an indication of a candidate recovery beam for the SCell, receiving a message from the other cell, and sending a media access control (MAC) control element (CE) after receiving the message, wherein the MAC CE is sent using one or more mechanisms to enhance reliability.

Certain aspects of the present disclosure are directed to an apparatus for wireless communication by a UE. The apparatus generally includes a memory and at least one processor coupled to the memory, the memory and the at least one processor being configured to perform beam BFD of a BPL associated with a SCell in CA, send a BFRQ message to another cell, the BFRQ message including an indication of a candidate recovery beam for the SCell, receive a message from the other cell, and send a MAC CE after receiving the message, wherein the MAC CE is sent using one or more mechanisms to enhance reliability.

Certain aspects of the present disclosure are directed to an apparatus for wireless communication by a UE. The apparatus generally includes means for performing beam BFD of a BPL associated with a SCell in CA, means for sending a BFRQ message to another cell, the BFRQ message including an indication of a candidate recovery beam for the SCell, means for receiving a message from the other cell, and means for sending a MAC CE after receiving the message, wherein the MAC CE is sent using one or more mechanisms to enhance reliability.

Certain aspects of the present disclosure are directed to a computer readable medium having instructions stored thereon for performing beam BFD of a BPL associated with a SCell in CA, sending a BFRQ message to another cell, the BFRQ message including an indication of a candidate recovery beam for the SCell, receiving a message from the other cell, and sending a MAC CE after receiving the message, wherein the MAC CE is sent using one or more mechanisms to enhance reliability.

Certain aspects of the present disclosure provide a method for wireless communication by a network entity. The method generally includes receiving a BFRQ message from a UE, the BFRQ message indicating a beam failure detected in a SCell and including an indication of a candidate recovery beam for the SCell, and sending a message to the UE, and receiving a MAC CE after sending the message, wherein the MAC CE is sent using one or more mechanisms to enhance reliability.

Certain aspects of the present disclosure are directed to an apparatus for wireless communication by a UE. The apparatus generally includes a memory and at least one processor coupled to the memory, the memory and the at least one processor being configured to receive a BFRQ message from a UE, the BFRQ message indicating a beam failure detected in a SCell and including an indication of a candidate recovery beam for the SCell, send a message to the UE, and receive a media access control MAC CE after sending the message, wherein the MAC CE is sent using one or more mechanisms to enhance reliability.

Certain aspects of the present disclosure are directed to an apparatus for wireless communication by a UE. The apparatus generally includes means for receiving a BFRQ message from a UE, the BFRQ message indicating a beam failure detected in a SCell and including an indication of a candidate recovery beam for the SCell, means for sending a message to the UE, and means for receiving a media access control MAC CE after sending the message, wherein the MAC CE is sent using one or more mechanisms to enhance reliability.

Certain aspects of the present disclosure are directed to a computer readable medium having instructions stored thereon for receiving a BFRQ message from a UE, the BFRQ message indicating a beam failure detected in a SCell and including an indication of a candidate recovery beam for the SCell, sending a message to the UE, and receiving a media access control MAC CE after sending the message, wherein the MAC CE is sent using one or more mechanisms to enhance reliability.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
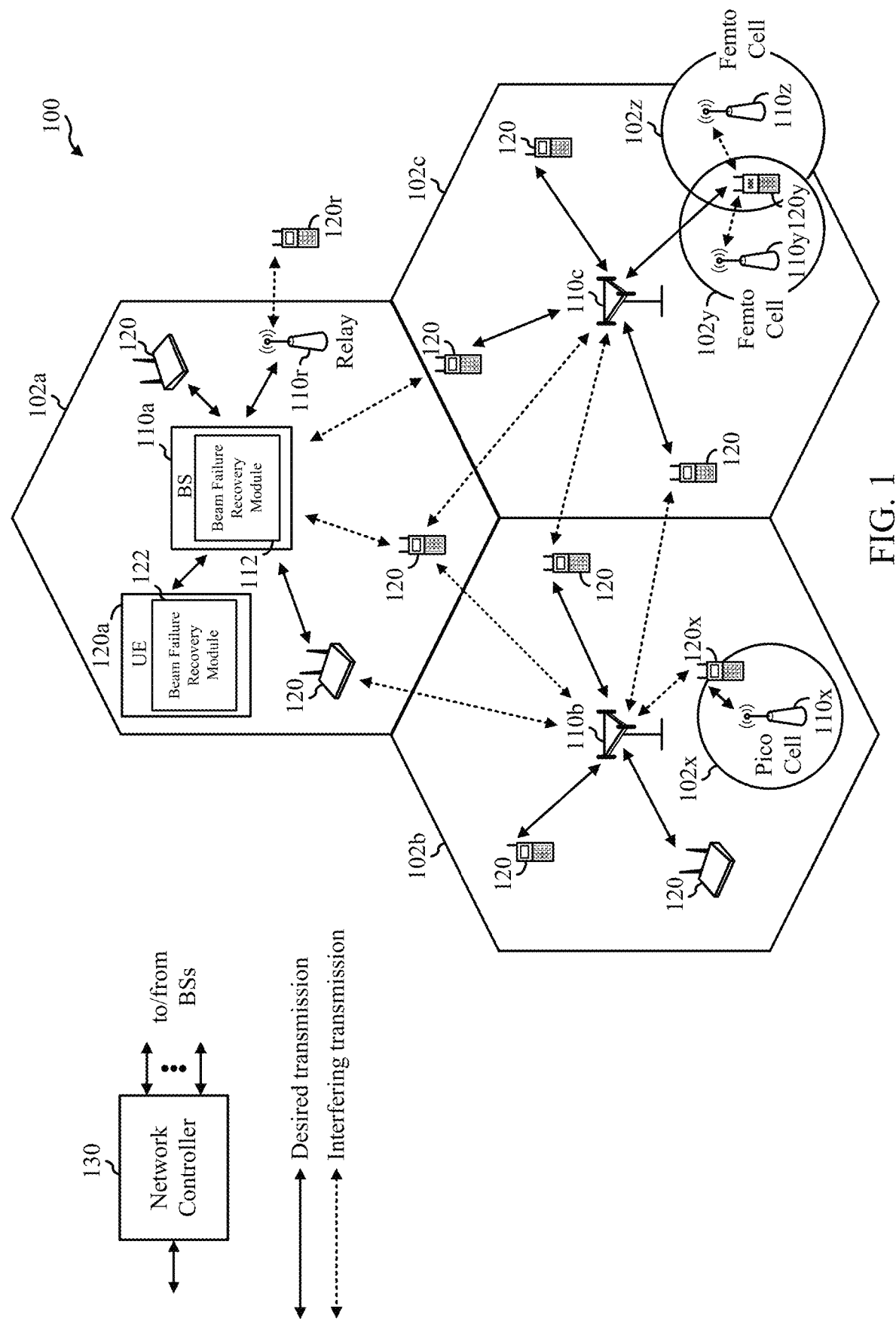
FIG. 1 is a block diagram conceptually illustrating an example telecommunications system, in accordance with certain aspects of the present disclosure.

Aspects of the present disclosure relate to wireless communications, and more particularly, to techniques for performing beam failure recovery involving a secondary cell. In some cases, one or more mechanisms may be utilized to increase reliability of BFR mechanism, implicitly providing higher priority for the recovery messaging. Examples of such mechanisms include beam sweeping and repetition.

The following description provides examples of aspects of the present disclosure, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Certain wireless networks utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

5G NR may utilize OFDM with a cyclic prefix (CP) on the uplink and downlink and include support for half-duplex operation using time division duplexing (TDD). A subframe can be 1 ms, but the basic transmission time interval (TTI) may be referred to as a slot. A subframe contains a variable number of slots (e.g., 1, 2, 4, 8, 16, . . . slots) depending on the subcarrier spacing (SCS). The NR resource block (RB) may be 12 consecutive frequency subcarriers. NR may support a base SCS of 15 KHz and other subcarrier spacing may be defined with respect to the base SCS, for example, 30 kHz, 60 kHz, 120 kHz, 240 kHz, etc. The symbol and slot lengths scale with the SCS. The CP length also depends on the SCS. 5G NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For a UE 120 of the network 100 may have a beam failure recovery module 122 configured to perform operations 400 of FIG. 4 and/or a BS 110 of the network 100 may have a beam failure recovery module 112 configured to perform operations 500 of FIG. 5.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
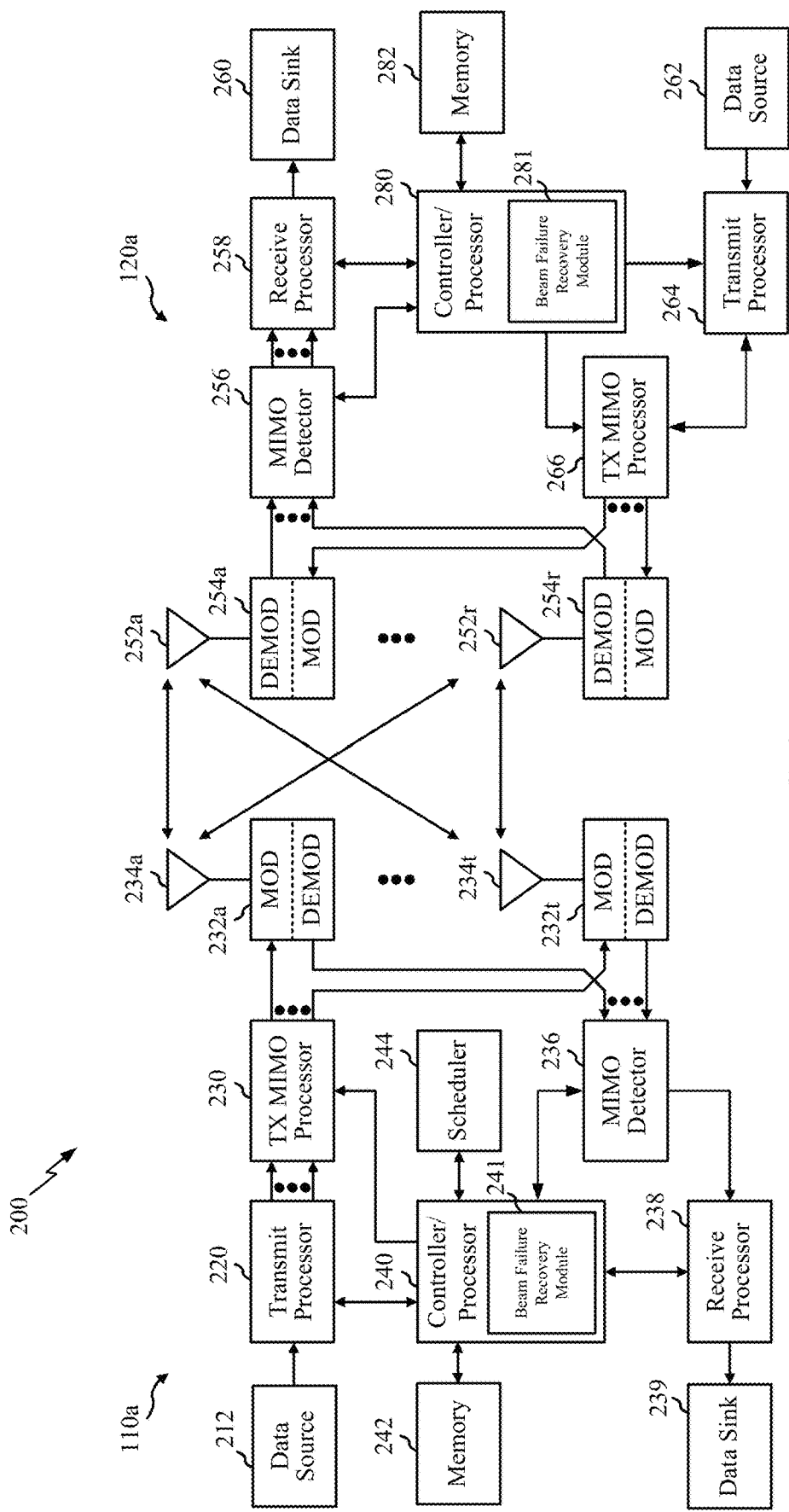
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a base station may transmit a MAC CE to a user-equipment (UE) to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. An MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a beam failure recovery module 241 that may be configured to perform operations 500 of FIG. 5. As shown in FIG. 2, the controller/processor 280 of the UE 120a has a beam failure recovery module 281 that may be configured to perform operations 400 of FIG. 4, according to aspects described herein. Although shown at the controller/processor, other components of the UE 120a and BS 110a may be used to perform the operations described herein.

Certain systems, such as NR, support carrier aggregation (CA). With CA, the UE can use multiple carriers/cells to communicate with a BS (or multiple BSs). CA involves a primary cell (PCell) and at least one secondary cell (SCell). An SCell may configured for downlink only, or configured for both uplink and downlink. The PCell and SCell(s) can be in different frequency bands, such as a PCell in one frequency range (e.g., FR1, sub-6 GHz) and the SCell in another frequency range (FR2, 28 GHz). The PCell and SCell may use different tone spacing or subcarrier spacing (SCS), leading to different symbol lengths for the PCell and SCell(s). For example, in the F1 the symbols length for a 120 KHz SCS is eight times short than a symbol length for a 15 kHz SCS in FR1.

In FR2 (mmW communications), directional beamforming are used b/w UE and gNB. As such, the UE and gNB communicate via beam pair link (BPL). In some cases, the UE can detect beam failure (e.g. RSRP of BPL is bad), and send beam failure recovery request (BFRQ) to gNB. Such BFR process can be cell-specific (e.g., there can be PCell BFR and SCell BFR).

As mentioned above, aspects of the present disclosure relate beam failure detection and recovery. In some systems, narrow-beam transmission and reception is useful for improving the link budget at millimeter-wave (mmW) frequencies but may be susceptible to beam failure. In mmW, direction beamforming is used between the UE and a BS, and the UE and BS communicate via a beam pair link (BPL). A beam failure generally refers to a scenario in which the quality of a beam falls below a threshold, which may lead to radio link failure (RLF). NR supports a lower layer signaling to recover from beam failure, referred to as beam recovery. For example, instead of initiating a cell reselection when a beam quality becomes too low, a beam pair reselection within the cell may be performed.

Figure 3:
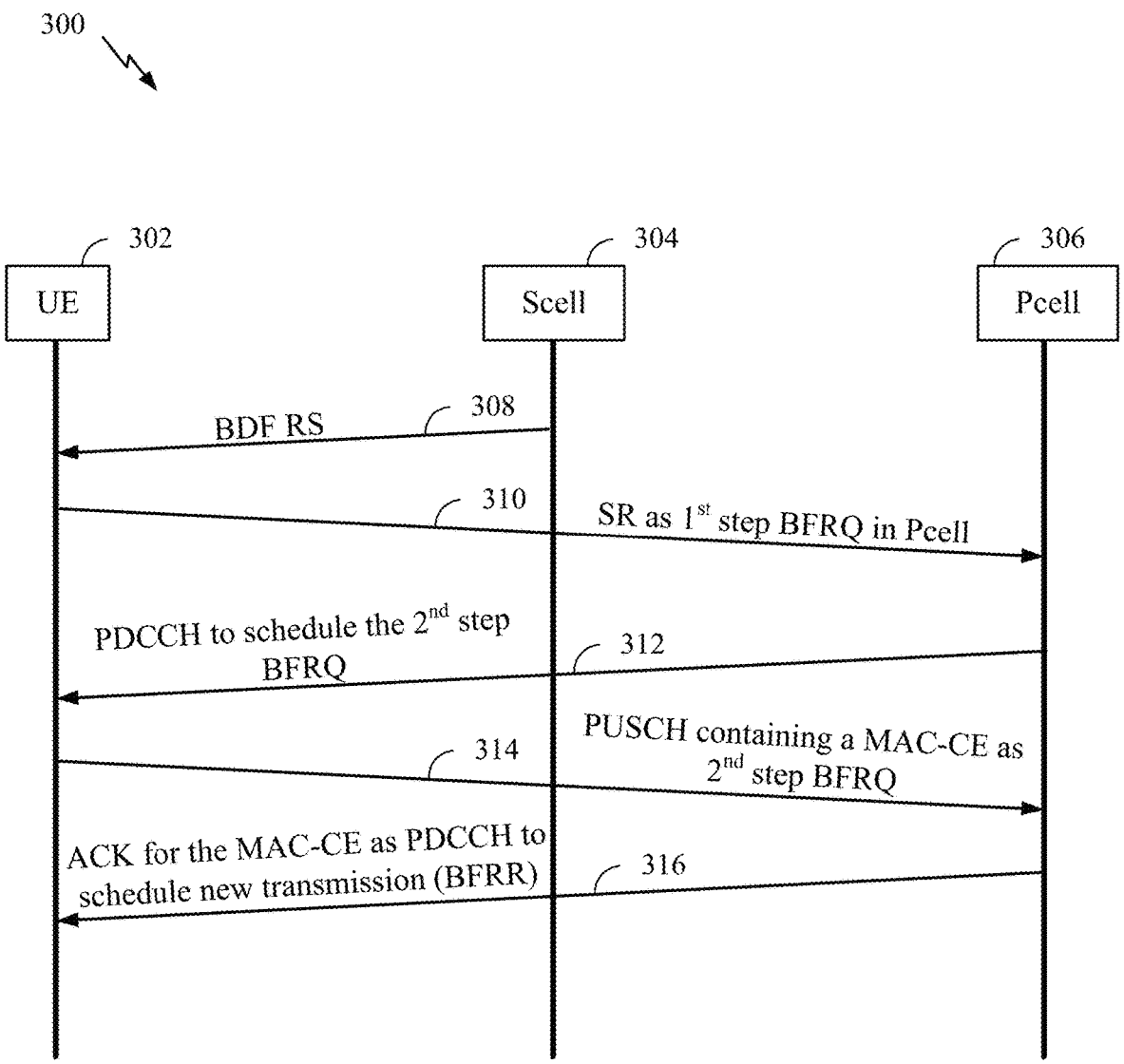
FIG. 3 is an example beam failure detection and recovery procedure that may be enhanced, in accordance with certain aspects of the present disclosure.

FIG. 3 illustrates an example beam failure detection and recovery procedure, in accordance with certain aspects of the present disclosure. Beam failure may be detected by monitoring a beam failure detection (BFD) reference signal (RS) and assessing if a beam failure trigger condition has been met. As shown in FIG. 3, the UE 302 monitors, at 308, the BFD RS from the SCell 304. In some examples, beam failure detection is triggered if an estimated block error rate (BLER) of reference signals associated with a configured control resource set (CORESET) is above a threshold (e.g., 10%). In some examples, the UE 302 detects beam failure when the reference signal receive power (RSRP) of a BPL is below a threshold.

To recover the SCell 304, the UE 302 can send a beam failure request (BFRQ) message on another cell. In some examples, the BFRQ is sent on the PCell 306, as shown in FIG. 3. In NR systems, a two-step BFRQ may be used. The BFRQ may request a new transmission. As shown in FIG. 3, after detecting beam failure, the UE 302 sends the first step (or first stage) of the BFRQ at 310. The first step of the BFRQ message may include a scheduling request (SR) on the PCell 306. The SR may be sent on dedicated SR resources. The SR may request scheduling for the second step (or second stage) of the BFRQ message. As shown in FIG. 3, at 312, the UE 302 may receive a PDCCH from the PCell 306, in response to the SR, scheduling the second set of the BFRQ message. The UE 302 then sends the scheduled second step of the BFRQ message at 314 on the PCell 306. For example, the UE 302 sends a PUSCH including a MAC CE, as shown in FIG. 3. The MAC CE may include an index of the failed CC and a new recovery beam candidate beam. In some examples, to find candidate new beams, the UE may monitor a beam identification reference signal.

At 316, the PCell 306 responds to the BFRQ by transmitting a beam failure recovery response (BFRR) message to the UE 302, as shown in FIG. 3. The BFRR message may acknowledge the MAC CE and include an uplink grant scheduling a new transmission. For example, the uplink grant may schedule a transmission for the same HARQ process as the PUSCH carrying the MAC CE in the step two of the BFRQ. In some examples, the BFRR is sent over a CORESET (e.g., referred to as a CORESET-BFR) the UE 302 monitors for the response.

If the response is received successfully, the beam recovery is completed and a new BPL may be established. If the UE 302 cannot detect any response within a specific time period, the UE 302 may perform a retransmission of the request. If the UE 302 cannot detect any response after a specified number of retransmissions, then the UE 302 may notify higher layers, potentially leading to RLF and cell reselection.

After receiving the BFRR, at 316, and before the new BPL is established, the UE 302 may communicate on the SCell 304 using a default beam.

Techniques and apparatus for the UE and BS (associated with the SCell) to determine when to apply the default beam are desirable.

Example High Reliability Transmission (Tx) Mode for 2-Step SCell BFR

Aspects of the present disclosure relate to wireless communications, and more particularly, to techniques for performing beam failure recovery involving a secondary cell. In some cases, one or more mechanisms may be utilized to increase reliability of a beam failure recovery (BFR) mechanism by implicitly providing higher priority for the recovery messaging. Examples of such mechanisms include beam sweeping and repetition.

As noted above, for secondary cell (SCell) beam failure detection, a BFR request (BFRQ) can be sent in a primary cell (PCell) physical uplink control channel (PUCCH) as a dedicated scheduling request, for example, according to the two-step BFRQ procedure is described above with reference to FIG. 3. Techniques described herein utilize one or more mechanisms to increase reliability of the BFR mechanism, for example, implicitly providing higher priority for the recovery messaging, for example, for the medium access control (MAC) control element (CE) sent by the user equipment (UE) (e.g., which may include information regarding the cell in which the beam failure was detected and/or indication of a new candidate beam).

Figure 4:
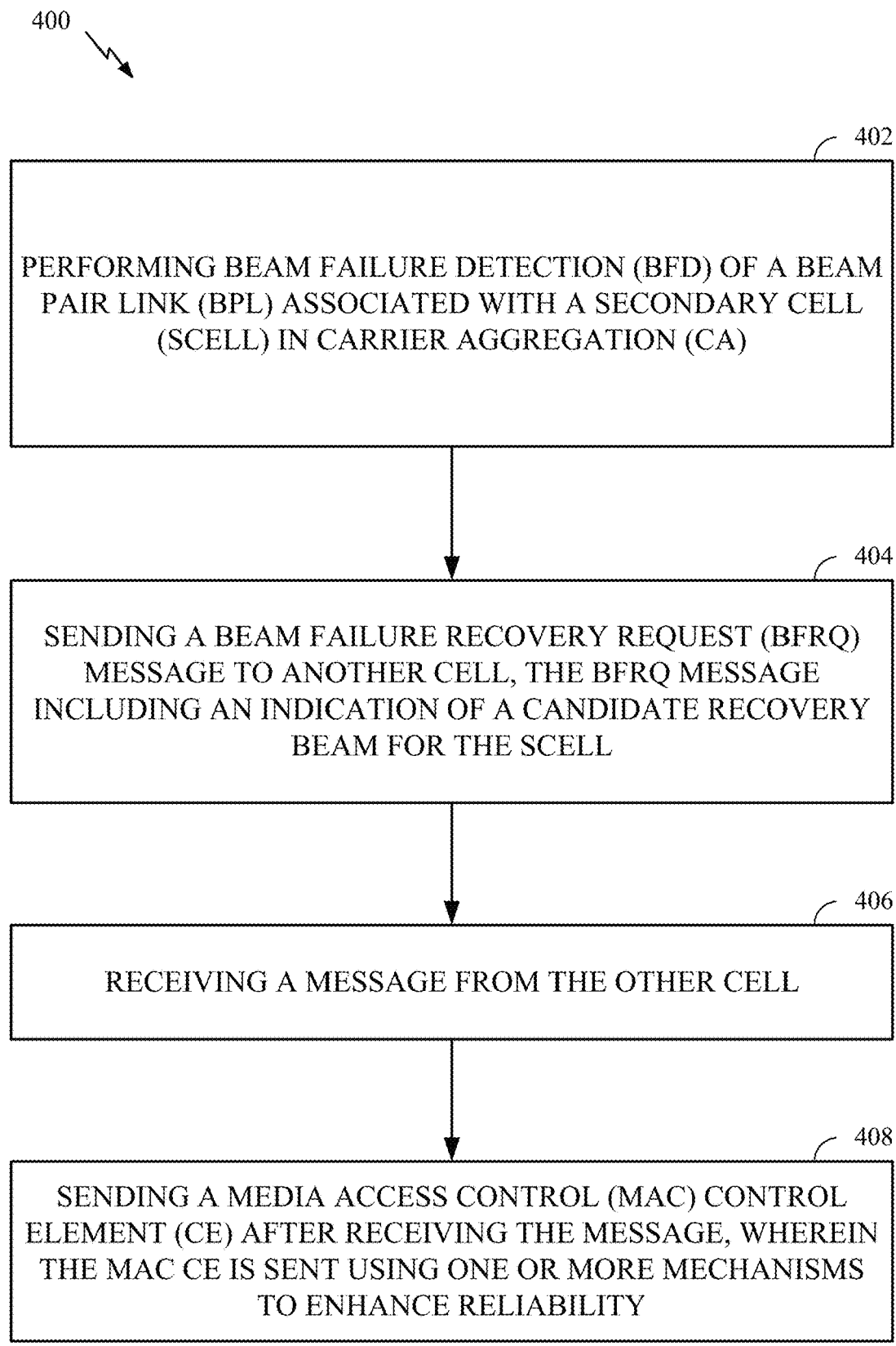
FIG. 4 illustrates example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., such as a UE 120a in the wireless communication network 100). Operations 400 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 402, by performing beam failure detection (BFD) of a beam pair link (BPL) associated with a SCell in carrier aggregation (CA). At 404, the UE sends a BFRQ message to another cell, the BFRQ message including an indication of a candidate recovery beam for the SCell. At 406, the UE receives a message from the other cell. At 408, the UE sends a MAC CE after receiving the message, wherein the MAC CE is sent using one or more mechanisms to enhance reliability.

Figure 5:
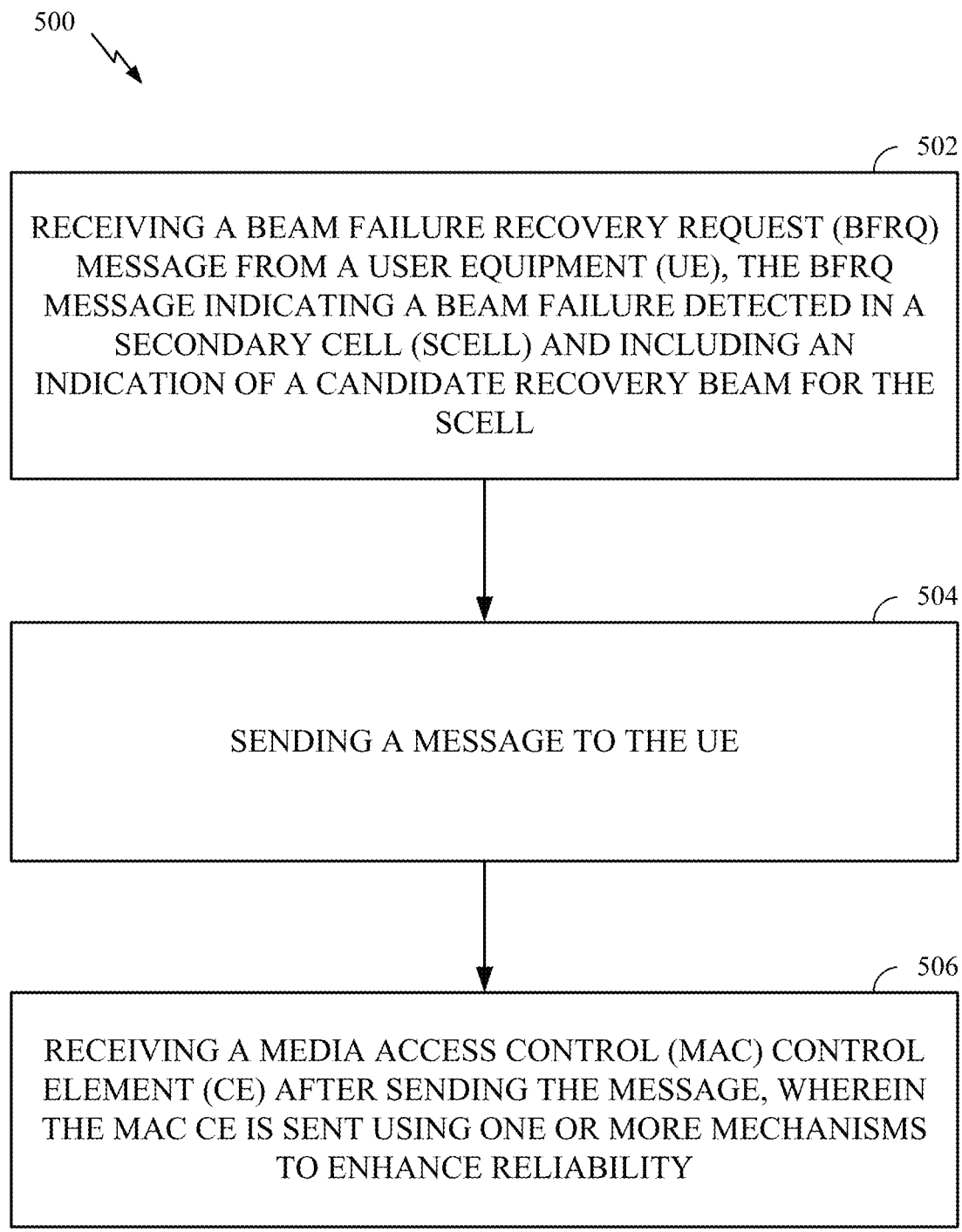
FIG. 5 illustrates example operations for wireless communication by a network entity, in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100). The operations 500 may be complementary operations by the BS to the operations 400 performed by the UE. Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at 502, by receiving a BFRQ message from a UE, the BFRQ message indicating a beam failure detected in a SCell and including an indication of a candidate recovery beam for the SCell. At 504, the network entity sends a message to the UE. At 506, the network entity receives a MAC CE after sending the message, wherein the MAC CE is sent using one or more mechanisms to enhance reliability.

Figure 6:
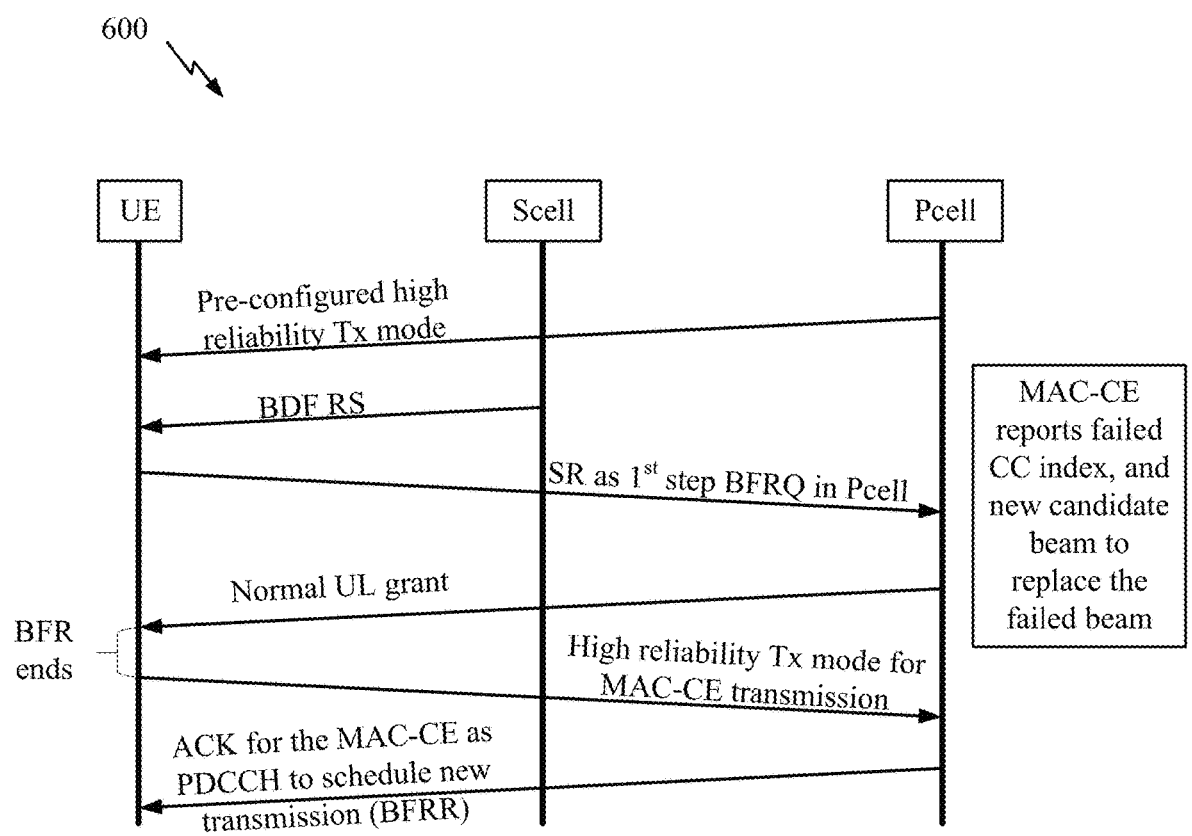
FIG. 6 is an example beam failure detection and recovery procedure, in accordance with certain aspects of the present disclosure.

Operations 400 and 500 of FIGS. 4 and 5 may be understood with reference to the call flow diagram of FIG. 6. As illustrated, after detecting a beam failure, the UE sends a BFRQ (e.g., a scheduling request in PCell or a PUCCH-BFR).

As illustrated in FIG. 6, in some cases, the response (e.g., a message from the PCELL) after the UE transmits the PUCCH-BFR can be a normal uplink grant (e.g., with a cell radio network temporary identifier (C-RNTI) and/or a modulation and coding scheme (MCS) C-RNTI).

After receiving the response message from the PCell, the UE may transmit the MAC CE (e.g., with information regarding the cell in which the failure was detected and a candidate beam) using a high reliability transmission (Tx) mode.

By transmitting the SCell BFR MAC CE with higher reliability (e.g., with beam sweeping and/or repetition), the SCell BFR MAC CE may, in effect, have higher priority.

As illustrated, in some cases, the BFR MAC CE may be transmitted (e.g., with beam sweeping and/or repetition) within a time window starting from the end of the PCell response. Within this time window, the UE can transmit the MAC CE (e.g., in step 2 of the 2-step process) with a previously known UL grant, which is either downlink control information (DCI) based (e.g., via the PCell response) or could be configured grant (CG) based (which generally refers to a grant of periodic uplink resources).

In some cases, the UE may overwrite related uplink grant information to transmit the MAC CE, for example, based on a pre-configured high reliability Tx mode.

In some cases, the high reliability Tx mode can be based on a pre-determined beam sweep pattern (e.g., the UE transmits the MAC CE multiple times using different transmit beams according to the pattern). In some cases, the high reliability Tx mode can be a pre-determined repetition pattern (e.g., with an indicated beam given by original uplink grant). The beam sweep pattern and/or repetition pattern could be configured (e.g., signaled via radio resource control (RRC), MAC CE, or DCI).

The duration of the time window (e.g., triggered/starting from the PCell response) duration can be a fixed value, for example, in terms of a number of slots (e.g., ceil(N2/14)) slots. In some cases, the duration of the time window could be dynamically configured by a gNB.

Example Embodiments

Embodiment 1: A method for wireless communication by a user equipment (UE), comprising performing beam failure detection (BFD) of a beam pair link (BPL) associated with a secondary cell (SCell) in carrier aggregation (CA), sending a beam failure recovery request (BFRQ) message to another cell, the BFRQ message including an indication of a candidate recovery beam for the SCell, receiving a message from the other cell, and sending a media access control (MAC) control element (CE) after receiving the message, wherein the MAC CE is sent using one or more mechanisms to enhance reliability.

Embodiment 2: The method of Embodiment 1, wherein the message conveys a grant of resources for sending the MAC CE.

Embodiment 3: The method of Embodiment 1, wherein the one or more mechanisms comprise beam sweeping wherein the MAC CE is sent multiple times with different transmit beams.

Embodiment 4: The method of Embodiment 3, wherein the different transmit beams are defined by a beam sweep pattern.

Embodiment 5: The method of Embodiment 4, further comprising receiving signaling indicating the beam sweep pattern.

Embodiment 6: The method of any of Embodiments 3-5, wherein the beam sweeping is performed within a time window triggered by reception of the message from the other cell.

Embodiment 7: The method of Embodiment 6, wherein the time window is dynamically configured.

Embodiment 8: The method of any of Embodiments 1-7, wherein the one or more mechanisms comprise sending the MAC CE with repetition.

Embodiment 9: The method of Embodiment 8, wherein the repetition is defined by a repetition pattern and sent according to a beam indicated in the message.

Embodiment 10: The method of Embodiment 9, further comprising receiving signaling indicating the repetition pattern.

Embodiment 11: The method of Embodiment 10, wherein the repetition is performed within a time window triggered by reception of the message from the other cell.

Embodiment 12: The method of Embodiment 11, wherein the time window is dynamically configured.

Embodiment 13: The method of any of Embodiments 1-12, wherein the message from the other cell comprises an uplink grant scrambled by C-RNTI or MCS-C-RNTI.

Embodiment 14: A method for wireless communication by a network entity, comprising receiving a BFRQ message from a UE, the BFRQ message indicating a beam failure detected in a SCell and including an indication of a candidate recovery beam for the SCell, sending a message to the UE, and receiving a MAC CE after sending the message, wherein the MAC CE is sent using one or more mechanisms to enhance reliability.

Embodiment 15: The method of Embodiment 14, wherein the message conveys a grant of resources for sending the MAC CE.

Embodiment 16: The method of Embodiment 14 or 15, wherein the one or more mechanisms comprise beam sweeping wherein the MAC CE is sent by the UE multiple times with different transmit beams.

Embodiment 17: The method of Embodiment 16, wherein the different transmit beams are defined by a beam sweep pattern.

Embodiment 18: The method of Embodiment 17, further comprising providing signaling to the UE indicating the beam sweep pattern.

Embodiment 19: The method of any of Embodiments 16-18, wherein the beam sweeping is performed within a time window triggered by reception of the message.

Embodiment 20: The method of Embodiment 19, wherein the time window is dynamically configured by the network entity.

Embodiment 21: The method of any of Embodiments 14-20, wherein the one or more mechanisms comprise sending the MAC CE with repetition.

Embodiment 22: The method of Embodiment 21, wherein the repetition is defined by a repetition pattern and sent according to a beam indicated in the message.

Embodiment 23: The method of Embodiment 22, further comprising providing signaling to the UE indicating the repetition pattern.

Embodiment 24: The method of Embodiment 23, wherein the repetition is performed within a time window triggered by reception of the message.

Embodiment 25: The method of Embodiment 24, wherein the time window is dynamically configured by the network entity.

Embodiment 26: The method of any of Embodiments 14-25, wherein the message comprises an uplink grant scrambled by C-RNTI or MCS-C-RNTI.

Embodiment 27: An apparatus for wireless communication by a UE, comprising a memory and at least one processor coupled to the memory, the memory and the at least one processor being configured to perform BFD of a BPL associated with a SCell in CA, send a BFRQ message to another cell, the BFRQ message including an indication of a candidate recovery beam for the SCell, receive a message from the other cell, and send a MAC CE after receiving the message, wherein the MAC CE is sent using one or more mechanisms to enhance reliability.

Embodiment 28: The apparatus of Embodiment 27, wherein the message conveys a grant of resources for sending the MAC CE.

Embodiment 29: An apparatus for wireless communication by a UE, comprising a memory and at least one processor coupled to the memory, the memory and the at least one processor being configured to receive a BFRQ message from a UE, the BFRQ message indicating a beam failure detected in a SCell and including an indication of a candidate recovery beam for the SCell, send a message to the UE, and receive a MAC CE after sending the message, wherein the MAC CE is sent using one or more mechanisms to enhance reliability.

Embodiment 30: The apparatus of Embodiment 29, wherein the message conveys a grant of resources for sending the MAC CE.

Embodiment 31: An apparatus for wireless communication by a UE, comprising means for performing beam BFD of a BPL associated with a SCell in CA, means for sending a BFRQ message to another cell, the BFRQ message including an indication of a candidate recovery beam for the SCell, means for receiving a message from the other cell, and means for sending a MAC CE after receiving the message, wherein the MAC CE is sent using one or more mechanisms to enhance reliability.

Embodiment 32: A computer readable medium having instructions stored thereon for performing beam BFD of a BPL associated with a SCell in CA, sending a BFRQ message to another cell, the BFRQ message including an indication of a candidate recovery beam for the SCell, receiving a message from the other cell, and sending a MAC CE after receiving the message, wherein the MAC CE is sent using one or more mechanisms to enhance reliability.

Embodiment 33: An apparatus for wireless communication by a UE, comprising means for receiving a BFRQ message from a UE, the BFRQ message indicating a beam failure detected in a SCell and including an indication of a candidate recovery beam for the SCell, means for sending a message to the UE, and means for receiving a media access control MAC CE after sending the message, wherein the MAC CE is sent using one or more mechanisms to enhance reliability.

Embodiment 34: A computer readable medium having instructions stored thereon for receiving a BFRQ message from a UE, the BFRQ message indicating a beam failure detected in a SCell and including an indication of a candidate recovery beam for the SCell, sending a message to the UE, and receiving a media access control MAC CE after sending the message, wherein the MAC CE is sent using one or more mechanisms to enhance reliability.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
performing beam failure detection (BFD) of a beam pair link (BPL) associated with a secondary cell (SCell) in carrier aggregation (CA);
sending a beam failure recovery request (BFRQ) message to another cell, the BFRQ message including an indication of a candidate recovery beam for the SCell;
receiving a message from the other cell; and
sending a media access control (MAC) control element (CE) after receiving the message, wherein the MAC CE is sent using one or more mechanisms to enhance reliability, wherein the one or more mechanisms comprise:
beam sweeping and sending the MAC CE multiple times with different transmit beams, or
sending the MAC CE with repetition defined by a repetition pattern.

2. The method of claim 1, wherein the message conveys a grant of resources for sending the MAC CE.

3. The method of claim 1, wherein the different transmit beams are defined by a beam sweep pattern.

4. The method of claim 3, further comprising receiving signaling indicating the beam sweep pattern.

5. The method of claim 1, wherein the beam sweeping is performed within a time window triggered by reception of the message from the other cell.

6. The method of claim 5, wherein the time window is dynamically configured.

7. The method of claim 1, wherein the repetition is sent according to a beam indicated in the message.

8. The method of claim 7, further comprising receiving signaling indicating the repetition pattern.

9. The method of claim 8, wherein the repetition is performed within a time window triggered by reception of the message from the other cell.

10. The method of claim 9, wherein the time window is dynamically configured.

11. The method of claim 1, wherein the message from the other cell comprises an uplink grant scrambled by C-RNTI or MCS-C-RNTI.

12. A method for wireless communication by a network entity, comprising:
receiving a beam failure recovery request (BFRQ) message from a user equipment (UE), the BFRQ message indicating a beam failure detected in a secondary cell (SCell) and including an indication of a candidate recovery beam for the SCell;
sending a message to the UE; and
receiving a media access control (MAC) control element (CE) after sending the message, wherein the MAC CE is sent using one or more mechanisms to enhance reliability, wherein the one or more mechanisms comprise:
beam sweeping and sending the MAC CE multiple times with different transmit beams, or
sending the MAC CE with repetition defined by a repetition pattern.

13. The method of claim 12, wherein the message conveys a grant of resources for sending the MAC CE.

14. The method of claim 12, wherein the different transmit beams are defined by a beam sweep pattern.

15. The method of claim 14, further comprising providing signaling to the UE indicating the beam sweep pattern.

16. The method of claim 12, wherein the beam sweeping is performed within a time window triggered by reception of the message.

17. The method of claim 16, wherein the time window is dynamically configured by the network entity.

18. The method of claim 12, wherein the repetition is sent according to a beam indicated in the message.

19. The method of claim 18, further comprising providing signaling to the UE indicating the repetition pattern.

20. The method of claim 19, wherein the repetition is performed within a time window triggered by reception of the message.

21. The method of claim 20, wherein the time window is dynamically configured by the network entity.

22. The method of claim 12, wherein the message comprises an uplink grant scrambled by C-RNTI or MCS-C-RNTI.

23. An apparatus for wireless communication by a user equipment (UE), comprising:
a memory and at least one processor coupled to the memory, the memory and the at least one processor being configured to cause the apparatus to:
perform beam failure detection (BFD) of a beam pair link (BPL) associated with a secondary cell (SCell) in carrier aggregation (CA);

send a beam failure recovery request (BFRQ) message to another cell, the BFRQ message including an indication of a candidate recovery beam for the SCell;

receive a message from the other cell; and send a media access control (MAC) control element (CE) after receiving the message, wherein the MAC CE is sent using one or more mechanisms to enhance reliability, wherein the one or more mechanisms comprise:

beam sweeping and sending the MAC CE multiple times with different transmit beams, or sending the MAC CE with repetition defined by a repetition pattern.

24. The apparatus of claim 23, wherein the message conveys a grant of resources for sending the MAC CE.

25. An apparatus for wireless communication by a network entity, comprising:

a memory and at least one processor coupled to the memory, the memory and the at least one processor being configured to cause the apparatus to:

receive a beam failure recovery request (BFRQ) message from a user equipment (UE), the BFRQ message indicating a beam failure detected in a secondary cell (SCell) and including an indication of a candidate recovery beam for the SCell;

send a message to the UE; and receive a media access control (MAC) control element (CE) after sending the message, wherein the MAC CE is sent using one or more mechanisms to enhance reliability, wherein the one or more mechanisms comprise:

beam sweeping and sending the MAC CE multiple times with different transmit beams, or sending the MAC CE with repetition defined by a repetition pattern.

26. The apparatus of claim 25, wherein the message conveys a grant of resources for sending the MAC CE.

* * * * *